(12) United States Patent
Kondou et al.

(10) Patent No.: US 10,760,897 B2
(45) Date of Patent: Sep. 1, 2020

(54) OPTICAL SENSOR

(71) Applicant: MITSUBISHI HEAVY INDUSTRIES, LTD., Tokyo (JP)

(72) Inventors: Akio Kondou, Tokyo (JP); Tomoyuki Onishi, Tokyo (JP); Takahiro Miyamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/308,054

(22) PCT Filed: Jun. 7, 2017

(86) PCT No.: PCT/JP2017/021053
§ 371 (c)(1),
(2) Date: Dec. 7, 2018

(87) PCT Pub. No.: WO2017/213161
PCT Pub. Date: Dec. 14, 2017

(65) Prior Publication Data
US 2019/0310075 A1    Oct. 10, 2019

(30) Foreign Application Priority Data

Jun. 7, 2016  (JP) .................................. 2016-113203

(51) Int. Cl.
*G01B 9/02* (2006.01)
*G01B 11/14* (2006.01)

(52) U.S. Cl.
CPC .................................. *G01B 11/14* (2013.01)

(58) Field of Classification Search
CPC ....... G01B 11/18; G01B 11/16; G01B 11/026; G01B 11/161; G01B 11/24; G01B 11/14;
(Continued)

(56) References Cited

U.S. PATENT DOCUMENTS 5,274,721 A    12/1993  Dickinson et al.
5,299,141 A     3/1994  Hungerford et al.
(Continued)

FOREIGN PATENT DOCUMENTS

CN        1285881     11/2006
CN       100417918     9/2008
(Continued)

OTHER PUBLICATIONS

International Search Report dated Aug. 1, 2017 in International (PCT) Application No. PCT/JP2017/021053 with English Translation.
(Continued)

*Primary Examiner* — Mesfin T Asfaw
(74) *Attorney, Agent, or Firm* — Wenderoth, Lind & Ponack, L.L.P.

(57) ABSTRACT

An optical sensor includes an optical fiber disposed in such a way that an end surface thereof is exposed in a distal end surface (10a) of a sensor head (10). The optical sensor includes: a first plate material (first metal plate) (20) in close parallel contact with the distal end surface of the sensor head, and in which a through-hole is formed in a position corresponding to the end surface of the optical fiber; and a second plate material (second metal plate) (30) disposed parallel to the first plate material (first metal plate) and toward the front thereof in a measuring direction, and in which a through-hole is formed at a point of intersection with a virtual straight line perpendicular to the end surface of the optical fiber. With this optical sensor, it is possible for clearance measurement to be performed even if the optical fiber becomes opaque or worn.

15 Claims, 6 Drawing Sheets

(58) Field of Classification Search
CPC .............. G01B 11/007; G01B 11/0608; G01B 11/0625; G01B 11/255; G01B 11/26; G01B 11/303; G01B 11/00; G01B 11/0658; G01B 11/272; G01B 11/285; G01B 2210/58; G01B 9/02069; G01B 9/02072; G01B 11/0675; G01B 11/12; G01B 2290/45; G01B 5/0002; G01B 5/012; G01B 5/28; G01B 7/14; G01B 7/16; G01B 7/24; G01B 9/2002; G01B 9/02007; G01B 9/02015; G01B 9/0203; G01D 5/268; G01D 5/353; G01D 5/35303; G01D 5/35341; G01D 5/3537; G01D 5/35374; G01D 5/3538; G01D 5/266; G01D 5/35309; G01D 5/35335; G01D 5/35393; G01D 5/35396
See application file for complete search history.

(56) References Cited

U.S. PATENT DOCUMENTS

| | | |
|---|---|---|
| 2004/0114154 A1 | 6/2004 | Luetche et al. |
| 2004/0222365 A1 | 11/2004 | Tobiason |
| 2008/0291456 A1* | 11/2008 | Ghislain .............. G01N 29/022 356/450 |

FOREIGN PATENT DOCUMENTS

| | | |
|---|---|---|
| CN | 201965258 | 9/2011 |
| CN | 202166608 | 3/2012 |
| CN | 104501728 | 4/2015 |
| JP | 59-134026 | 9/1984 |
| JP | 5-18981 | 1/1993 |
| JP | 7-63509 | 3/1995 |
| JP | 10-132752 | 5/1998 |
| JP | 2004-191374 | 7/2004 |
| JP | 2004-333470 | 11/2004 |
| JP | 2005-326362 | 11/2005 |
| JP | 2015-1414 | 1/2015 |

OTHER PUBLICATIONS

International Preliminary Report on Patentability and Written Opinion of the International Searching Authority dated Aug. 1, 2017 in International (PCT) Application No. PCT/JP2017/021053.

* cited by examiner

OPTICAL SENSOR

TECHNICAL FIELD

The present invention relates to optical sensors mainly included in rotating machines.

BACKGROUND ART

To improve performance of turbine machines, the tip clearance has to be reduced. This requires the tip clearance to be measured with high accuracy. Also in general rotating machines, the clearance between the rotational side and the stationary side is required to be measured with high accuracy.

PRIOR ART DOCUMENT

Patent Document

Patent Document 1: Japanese Utility Model Registration Application Publication No. Sho 59-134026

SUMMARY OF THE INVENTION

Problems to be Solved by the Invention

There are many problems to be solved in measuring a clearance under high temperature and high-pressure steam environment. For example, capacitance type clearance sensors cannot be used under such environment because a capacitance type clearance sensor may have an insulation failure due to deterioration and is also affected by variation in the dielectric constant.

In this regard, optical sensors are suitable for the usage because they are not affected as described above under high temperature and high-pressure steam environment. However, with conventional techniques, qualitative change can be caught, but quantitative measurement cannot be performed.

A reason why quantitative measurement cannot be performed is the occurrence of white turbidity or wear (depression, impairment) at the end portions of optical fibers included in the optical sensor. In other words, in an optical sensor exposed to high temperature and high-pressure steam, wear occurs in the optical fibers, and it is thought that white turbidity occurs before the optical fibers (the end portions) wear.

When white turbidity or wear occurs at the end portion of an optical fiber, the direction of light that enters the optical fiber changes. Based on the measurement principle of the optical sensor, a change in the direction of light that enters the optical fiber affects the clearance measurement.

Hence, it would be ideal if optical sensors could be made using an optical material that does not cause white turbidity or wear in optical fibers even under high temperature and high steam environment, but this is not realistic.

Thus, in light of the above technical problems, an object of the present invention is to provide an optical sensor capable of performing clearance measurement even after white turbidity or wear occurs in the optical fibers.

Means for Solving the Problems

An optical sensor according to a first aspect of the invention to solve the above problems is an optical sensor having a sensor head at a distal end surface of which a light emitting portion and a light receiving portion of optical fibers are disposed, characterized in that the optical sensor comprises:

a first plate material that is in parallel with and in close contact with the distal end surface of the sensor head and has through-holes formed at positions corresponding to the end surfaces of the optical fibers; and a second plate material that is disposed in parallel with the first plate material and at a position on a measurement object side of the first plate material and has through-holes at intersections of the second plate material and imaginary lines orthogonal to the light emitting portion and the light receiving portion, respectively, of the optical fibers.

An optical sensor according to a second aspect of the invention to solve the above problems is the optical sensor according to the first aspect of the invention, characterized in that the distal end surface of the sensor head is disposed to face a moving object to be measured and to be in parallel with the moving direction, the optical fibers include a first light-receiving optical fiber and a second light-receiving optical fiber that receive light from the moving object at light receiving portions located at the distal end surface of the sensor head and input the received light to a first light receiving device and a second light receiving device, respectively, the through-holes of the first plate material include through-holes formed at positions corresponding to the light receiving portions of the first light-receiving optical fiber and the second light-receiving optical fiber, the through-holes of the second plate material include through-holes respectively formed at intersections of the second plate material and imaginary lines orthogonal to the light receiving portions of the first light-receiving optical fiber and the second light-receiving optical fiber, and the optical sensor further comprises a measuring unit that measures a clearance with the moving object based on timings at which the light from the moving object is inputted to the first light receiving device and the second light receiving device.

An optical sensor according to a third aspect of the invention to solve the above problems is the optical sensor according to the second aspect of the invention, characterized in that the optical fibers include an illuminating optical fiber that emits illumination light from a light emitting device, from the light emitting portion at the distal end surface of the sensor head toward the moving object, the through-holes of the first plate material include a through-hole formed at a position corresponding to the light emitting portion of the first illuminating optical fiber, the through-holes of the second plate material include a through-hole formed at an intersection of the second plate material and an imaginary line orthogonal to the light emitting portion of the first illuminating optical fiber, and the light from the moving object received by the first light-receiving optical fiber and the second light-receiving optical fiber is reflected light of the illumination light emitted from the illuminating optical fiber.

An optical sensor according to a fourth aspect of the invention to solve the above problems is the optical sensor according to any one of the first to third aspects of the invention, characterized in that an environmental resistance window, having a property that allows light to pass through the environmental resistance window and higher resistance to temperature and steam than the optical fibers, is disposed between the first plate material and the second plate material.

An optical sensor according to a fifth aspect of the invention to solve the above problems is the optical sensor according to any one of the first to third aspects of the invention, characterized in that an environmental resistance window, having a property that allows light to pass through the environmental resistance window and higher resistance to temperature and steam than the optical fibers, is embedded in each throughhole of the first plate material.

An optical sensor according to a sixth aspect of the invention to solve the above problems is the optical sensor according to any one of the third to fifth aspects of the invention, characterized in that an end surface of the illuminating optical fiber is spaced from the light receiving portions of the first light-receiving optical fiber and the second light-receiving optical fiber on the distal end surface of the sensor head.

An optical sensor according to a seventh aspect of the invention to solve the above problems is the optical sensor according to any one of the third to sixth aspects of the invention, characterized in that in the second plate material, the through-hole formed at the intersection of the second plate material and the imaginary line orthogonal to the light emitting portion of the illuminating optical fiber has a larger diameter than the through-holes formed at the intersections of the second plate material and the imaginary lines of the light receiving portions of the first light-receiving optical fiber and the second light-receiving optical fiber.

Effect of the Invention

The optical sensor according to the present invention is capable of performing clearance measurement even after white turbidity or wear occurs in the optical fibers.

MODE FOR CARRYING OUT THE INVENTION

Figure 1:
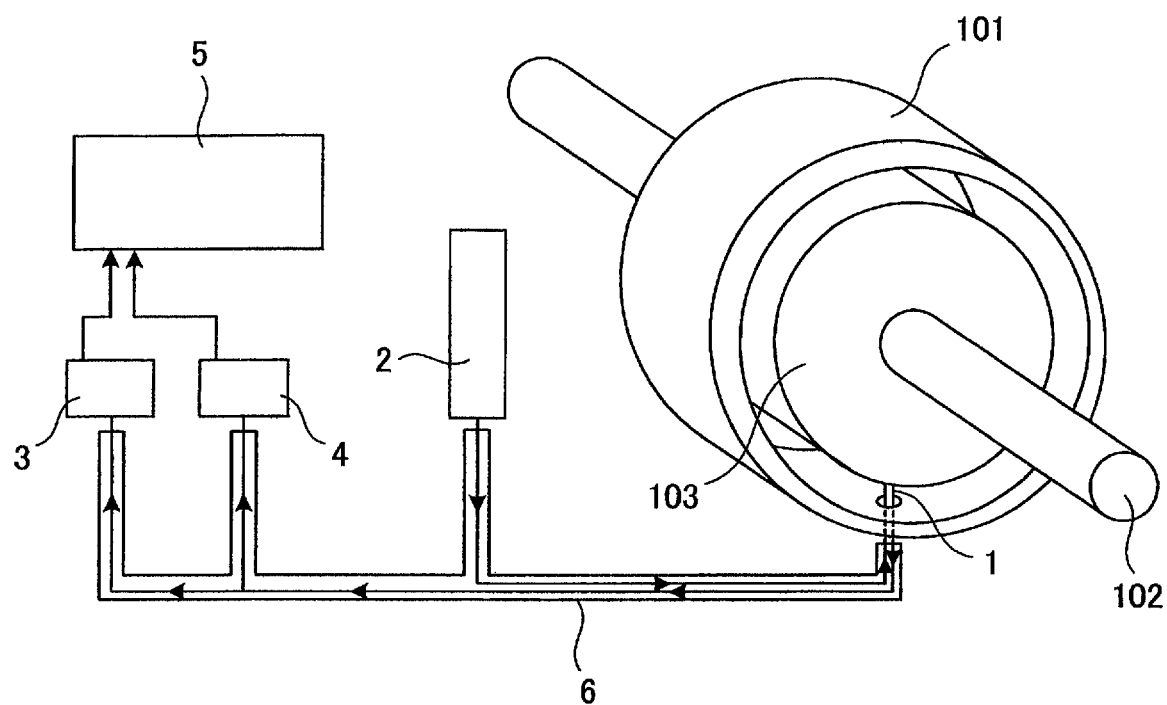
FIG. 1 is a simplified diagram for explaining an optical sensor according to the present invention provided to a rotating machine.

FIG. 1 is a simplified diagram for explaining an optical sensor according to the present invention provided to a rotating machine. As illustrated in FIG. 1, the rotating machine includes a rotor 103 fixed to a rotating shaft 102 in a housing 101 and having a clearance with the inner circumferential surface of the housing 101. The optical sensor according to the present invention is provided to the rotating machine such that the distal end of the optical sensor is disposed on the inner circumferential surface of the housing 101 so as to face the circumferential surface of the rotor 103.

More specifically, the optical sensor according to the present invention includes a sensor unit 1 disposed with its distal end surface facing the rotor 103 to be measured at the inner circumferential surface of the housing 101, a light emitting device (light source) 2 connected to the sensor unit 1 via a first optical fiber, a first light receiving device 3 connected to the sensor unit 1 via a second optical fiber, a second light receiving device 4 connected to the sensor unit 1 via a third optical fiber, and a measuring unit 5 connected to the first light receiving device 3 and the second light receiving device 4 (in FIG. 1, the first to third optical fibers are collectively indicated by reference sign 6).

As for the measurement procedure, first, during the operation of the rotating machine, the light emitting device 2 outputs illumination light to the sensor unit 1 through the first optical fiber, and this illumination light is emitted (projected) from the distal end of the sensor unit 1 (sensor head) toward the rotor 103.

The illumination light is reflected on the circumferential surface of the rotor 103, and part of the reflected light enters the sensor head and is inputted both to the first light receiving device 3 through the second optical fiber and to the second light receiving device 4 through the third optical fiber.

Here, the reflected light entering the sensor head from the rotor 103 has predetermined intensity cycles that depend on the shapes or patterns changing in the circumferential direction (rotation direction) on the circumferential surface of the rotor 103. This "shape" is a shape of the rotor blades, for example, in the case where the rotor 103 is a turbine. The "pattern" refers to light and dark portions made by, for example, marking in the case where there is no changing shape in the circumferential direction on the circumferential surface of the rotor 103.

The measuring unit 5 measures a clearance with the rotor 103 based on the respective timings at which the reflected light (from the circumferential surface of the rotor 103) is inputted to the first light receiving device 3 and the second light receiving device 4.

The above is the procedure for measuring a clearance with a rotating machine, using the optical sensor according to the present invention.

Hereinafter, an embodiment of the optical sensor according to the present invention will be described in detail. Note that although in the following embodiment, there are portions where description is provided assuming that the optical sensor is provided to a turbine, the present invention is not limited to this case but is applicable to general rotating machines.

Moreover, based on the principle (the following formula (1) and FIG. 4) described in the following embodiment, the optical sensor according to the present invention can measure not only a clearance with the rotor of a rotating machine but a clearance with any moving object.

Embodiment 1

Figure 3A:
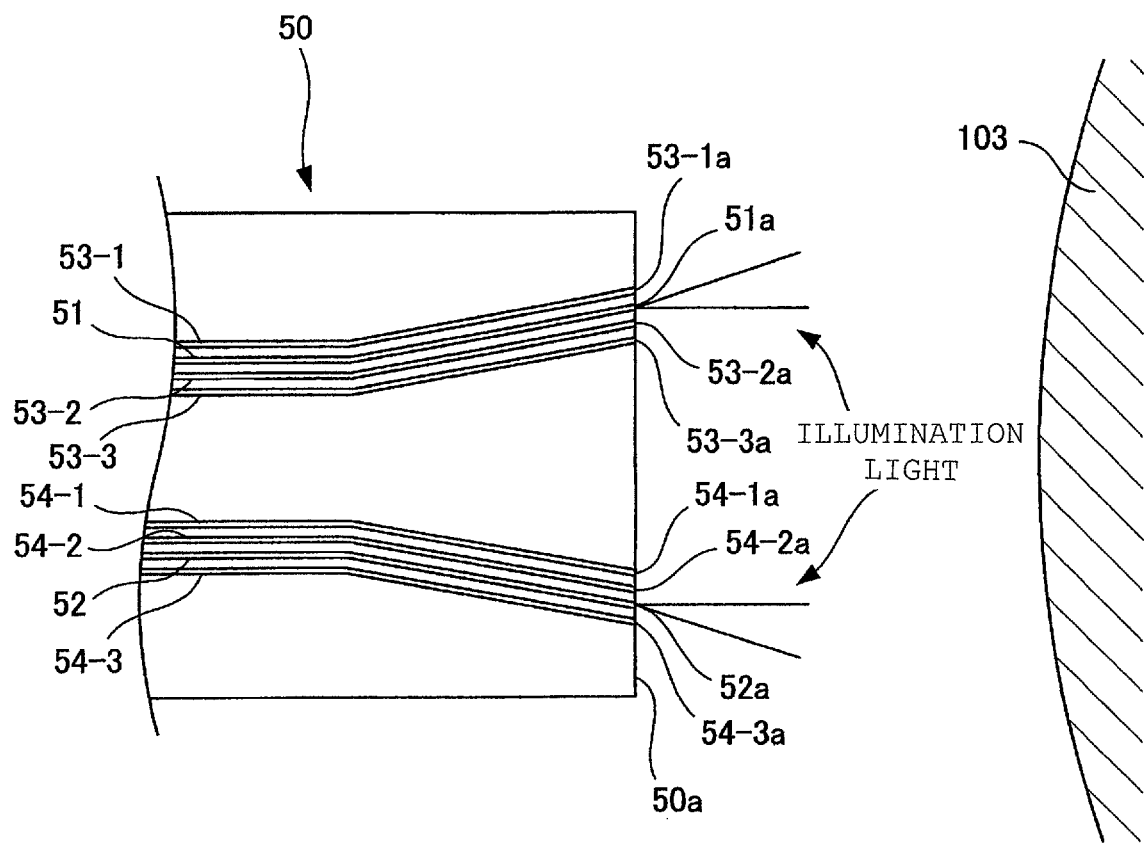
FIG. 3A is a cross-sectional view of a sensor head and its periphery of a conventional optical sensor (in the initial state) in the sensor axis direction.
Figure 3B:
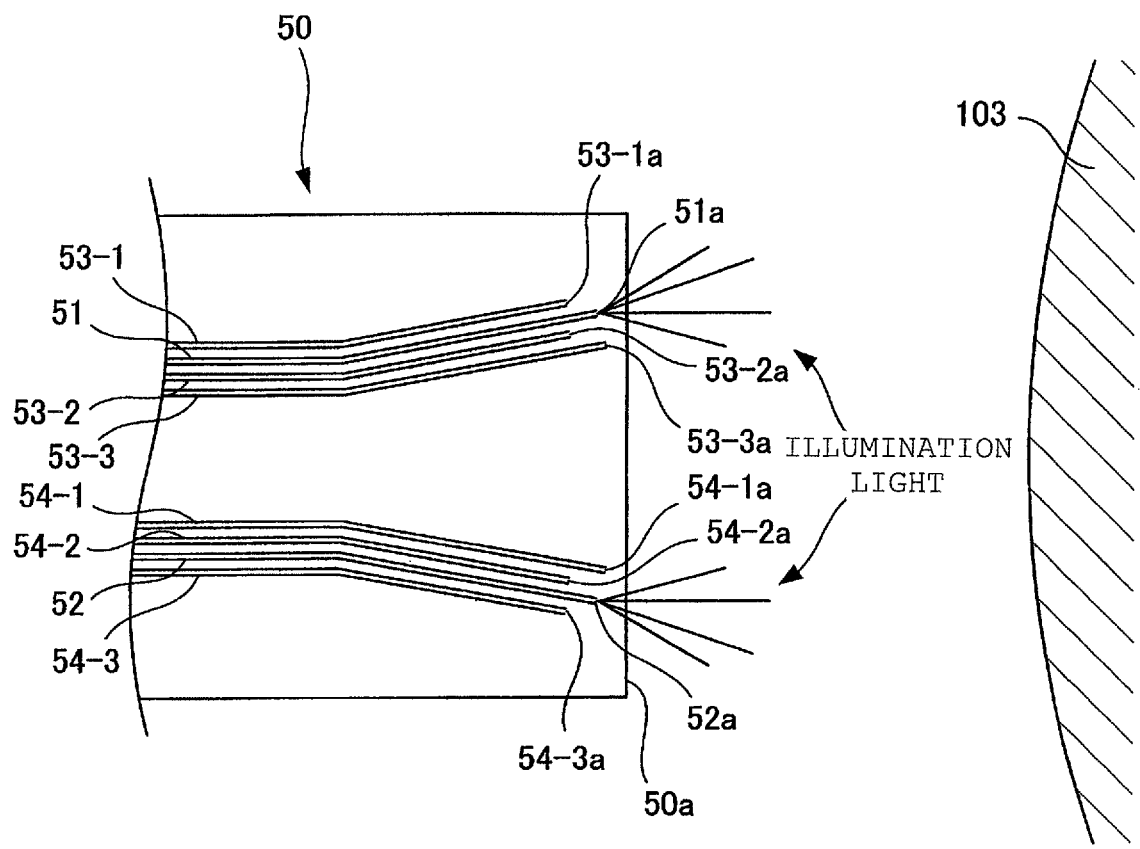
FIG. 3B is a cross-sectional view of the sensor head and its periphery of the conventional optical sensor (after white turbidity or wear has occurred) in the sensor axis direction.

FIG. 3A is a cross-sectional view of the sensor head and its periphery of a conventional optical sensor in the sensor axis direction, in the initial (normal) state (a cross-sectional view in parallel with a radial section of the rotor 103), and FIG. 3B is a cross-sectional view of the sensor head and its periphery of the conventional optical sensor in the sensor axis direction, after white turbidity or wear has occurred. First, the initial state will be described with reference to FIG. 3A.

The conventional optical sensor includes illuminating optical fibers 51 and 52 (first optical fiber), first light-receiving optical fibers 53-1, 53-2, and 53-3 (second optical fiber), and second light-receiving optical fibers 54-1, 54-2, and 54-3 (third optical fiber), and the distal end surface 50a of the sensor head 50 faces the circumferential surface of the rotor 103.

The illuminating optical fibers 51 and 52 each have one end connected to the light emitting device 2 (see FIG. 1) and the other end the end surface (light emitting portion) 51a or 52a of which is exposed at the distal end surface 50a. The illuminating optical fibers 51 and 52 are optical fibers as transmission paths that emit the illumination light outputted from the light emitting device 2, from the end surfaces 51a and 52a toward the circumferential surface of the rotor 103.

The first light-receiving optical fibers 53-1, 53-2, and 53-3 each have one end connected to the first light receiving device 3 (see FIG. 1) and the other end the end surface (light emitting portion) 53-1a, 53-2a, or 53-3a of which is exposed at the distal end surface 50a. The first light-receiving optical fibers 53-1, 53-2, and 53-3 are optical fibers as transmission paths that receive, at the end surfaces 53-1a, 53-2a, and 53-3a, the reflected light which is the illumination light reflected on the circumferential surface of the rotor 103 (transmission paths that the reflected light enters), and inputs the received light to the first light receiving device 3.

The second light-receiving optical fibers 54-1, 54-2, and 54-3 each have one end connected to the second light receiving device 4 (see FIG. 1) and the other end the end surface (light receiving portion) 54-1a, 54-2a, or 54-3a of which is exposed at the distal end surface 50a. The second light-receiving optical fibers 54-1, 54-2, and 54-3 are optical fibers as transmission paths that receive, at the end surfaces 54-1a, 54-2a, and 54-3a, the reflected light which is the illumination light reflected on the circumferential surface of the rotor 103, and inputs the received light to the second light receiving device 4.

Here, the first light-receiving optical fibers 53-1, 53-2, and 53-3, and the illuminating optical fiber 51 are gathered into one set, which is called an optical fiber set P. The second light-receiving optical fibers 54-1, 54-2, and 54-3, and the illuminating optical fiber 52 are gathered into one set, which is called an optical fiber set Q.

The optical fiber sets P and Q extend approximately in the axial direction of the optical sensor and incline, inside the sensor head 50, in an inverted V shape the mutual distance of which increases toward the distal end surface 50a (in cross-sectional view in parallel with a radial section of the rotor 103). In addition, as for the optical fiber sets P and Q, the positions and angles of the end surfaces 53-1a, 53-2a, and 53-3a, and the end surface 51a and those of the end surfaces 54-1a, 54-2a, and 54-3a, and the end surface 52a are disposed at the distal end surface 50a to be symmetrical about the center line of the optical sensor in the sensor axis direction.

The structure of the conventional optical sensor has been described above. Note that the procedure for measuring a clearance using the conventional optical sensor is as described above with reference to FIG. 1.

Figure 4:
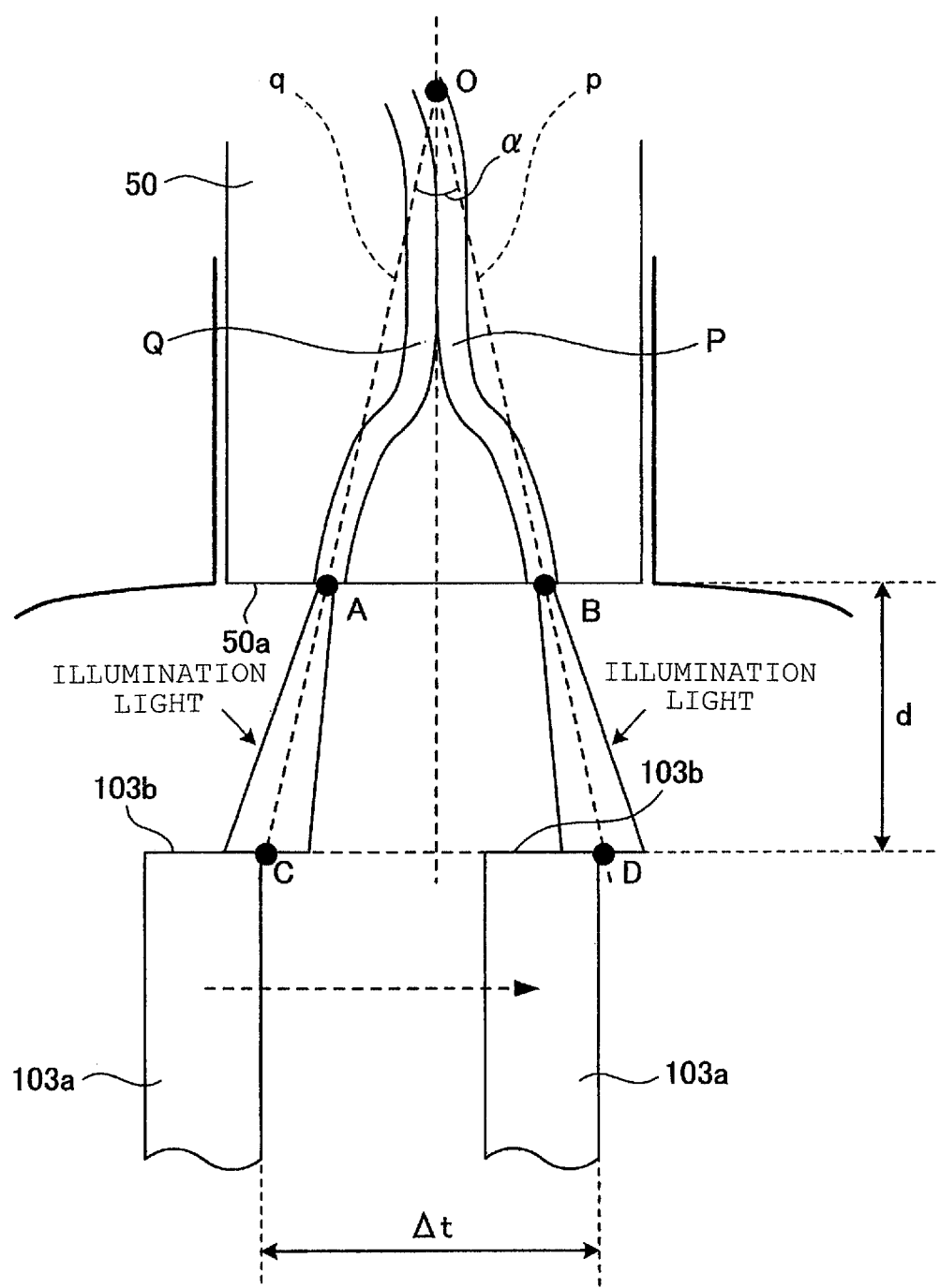
FIG. 4 is a schematic diagram for explaining clearance (tip clearance) measurement using an optical sensor, taking a turbine as an example.

FIG. 4 is a schematic diagram for explaining measuring a clearance (tip clearance) using an optical sensor, taking a turbine as an example, and the dashed arrow in the figure indicates the rotation direction of the rotor blades 103a of the rotor 103 (see FIG. 1).

The position of the end surfaces 54-1a, 54-2a, and 54-3a, and the end surface 52a of the optical fiber set Q on the distal end surface 50a is defined as point A (although there are the four end surface positions more specifically, the optical fibers 54-1, 54-2, 54-3, and 52 are gathered and close to each other, and the positions (and angles) of the end surfaces are approximately the same, so that these are assumed to be one point), and the position of the end surfaces 53-1a, 53-2a, and 53-3a, and the end surface 51a of the optical fiber set P is defined as point B (these four points are also assumed to be one point as in the case of point A).

In addition, the distance between point A and point B is defined as L. The intersection of three lines—imaginary line p orthogonal to the end surfaces 53-1a, 53-2a, and 53-3a (as in the above case, three imaginary lines, if described more specifically, are assumed to be one); imaginary line q orthogonal to the end surfaces 54-1a, 54-2a, and 54-3a (as in the above case, three imaginary lines, if described more specifically, are assumed to be one); and the center line in the sensor axis direction—is reference point O for distance measurement. The intersecting angle of the imaginary lines p and q at point O for distance measurement is defined as α.

In addition, the point at which the corner of the outer end surface 103b of the rotor blade 103a (the front corner of the two corners in the rotation direction) intersects imaginary line q is defined as point C; and the point at which the corner intersects imaginary line p is defined as point D. Note that this corner is a point at which the intensity of the reflected light that enters the first light-receiving optical fiber 33 and the second light-receiving optical fiber 34 changes (suddenly).

Further, the time taken for the rotor blade 103a to move from point C to point D is defined as Δt, and the clearance between the distal end surface 31a of the optical sensor and the outer end surface 103b of the rotor blades 103a (the clearance to be measured) is defined as d.

Based on the above, the following formula (1) holds.

[Math. 1]

$$d = \frac{\frac{1}{2}\overline{CD}}{\tan\frac{\alpha}{2}} - \frac{\frac{1}{2}\overline{AB}}{\tan\frac{\alpha}{2}} \qquad (1)$$

$$= \frac{\frac{1}{2} \times 2\pi R \times \frac{\Delta t}{T}}{\tan\frac{\alpha}{2}} - \frac{\frac{1}{2}L}{\tan\frac{\alpha}{2}}$$

where R is the radius of the rotor, and T is the period of the rotor.

Note that the above formula (1) holds when each of the optical fiber sets p and q includes one light-receiving optical fiber. In addition, since there is no coefficient related to the illuminating optical fibers in the above formula (1), the end surfaces of the illuminating optical fibers can be away from points A and B as long as the light-receiving optical fibers can receive the reflected light which is the illumination light reflected on the rotor 103 (in this case, points A and B indicate only the positions of the end surfaces of the light-receiving optical fibers).

In the conventional optical sensor, since the end surfaces 53-1a, 53-2a, 53-3a, 54-1a, 54-2a, and 54-3a, and the end surfaces 51a and 52a are located on the distal end surface 50a as illustrated in FIG. 3A, the above formula (1) holds when the illumination light is emitted, and the reflected light is received at the distal end surface 50a.

However, when white turbidity or wear occurs in the optical fibers 51, 52, 53-1, 53-2, 53-3, 54-1, 54-2, and 54-3 as illustrated in FIG. 3B, the emission positions and the spread of the illumination light are random, and the light receiving positions and the light receiving angles of the reflected light are also random, so that $\alpha$ in the above formula (1) is uncertain, and the above formula (1) does not hold.

Although it is possible that pipes having narrow metal holes and adapted to fit to the distal ends of the optical fibers are provided to surely regulate the light paths with these narrow metal holes as described in the above Patent Document 1, this method has difficulty in forming the pipes accurately because of the small diameters of the narrow metal holes.

On the other hand, the optical sensor according to this embodiment, having two metal plates with through-holes and an environmental resistance window, makes it possible for the above formula (1) to hold even when white turbidity or wear occurs in the optical fibers, enabling the clearance measurement, and further, the optical sensor according to this embodiment is easier to make than the optical sensor described in the above Patent Document 1.

Figure 2A:
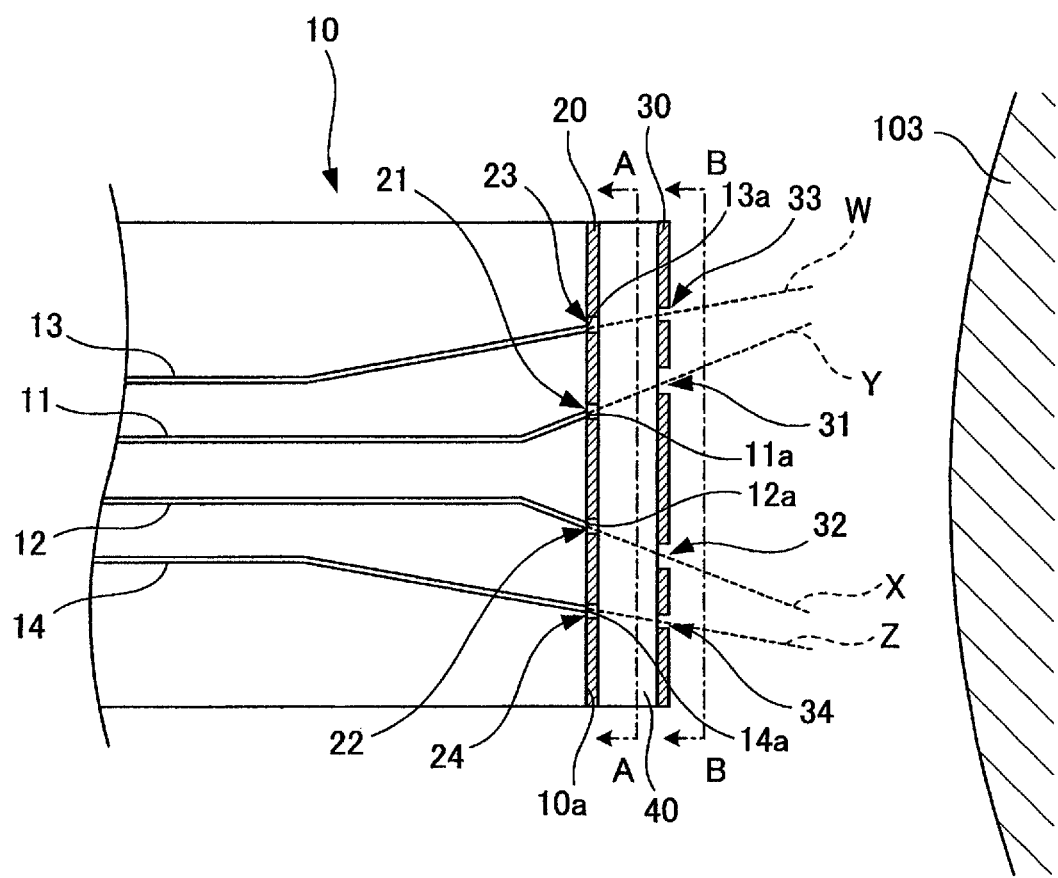
FIG. 2A is a cross-sectional view of a sensor head and its periphery of an optical sensor according to embodiment 1 of the present invention in the sensor axis direction.
Figure 2B:
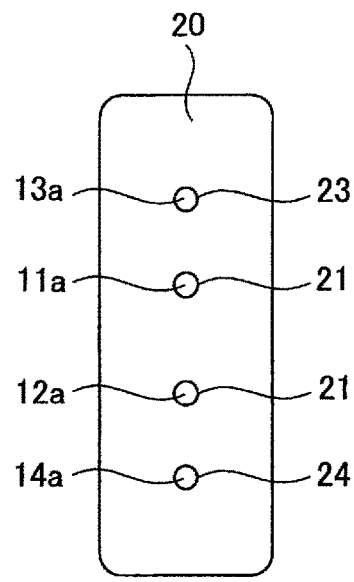
FIG. 2B is a view from arrows A-A in FIG. 2A.
Figure 2C:
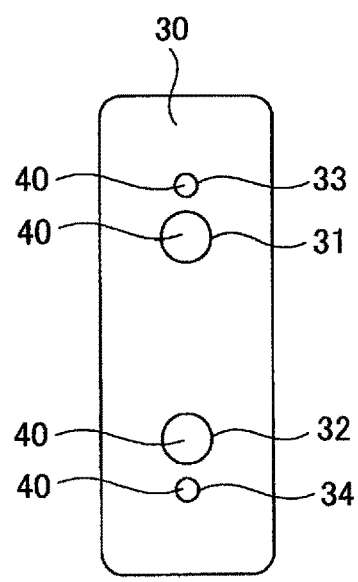
FIG. 2C is a view from arrows B-B in FIG. 2A.

FIG. 2A is a cross-sectional view, in the sensor axis direction, of the sensor head and its periphery of an optical sensor according to this embodiment (in other words, a cross-sectional view in parallel with an radial cross section of the rotor 103), FIG. 2B is a view from arrows A-A in FIG. 2A, and FIG. 2C is a view from arrows B-B in FIG. 2A.

As illustrated in FIG. 2A, first, the optical sensor according to this embodiment includes a first illuminating optical fiber 11 and a second illuminating optical fiber 12 (first optical fiber), a first light-receiving optical fiber 13 (second optical fiber), and a second light-receiving optical fiber 14 (third optical fiber), and the distal end surface 10a of the sensor head 10 faces the circumferential surface of the rotor 103.

The first illuminating optical fiber 11 has one end connected to the light emitting device 2 (see FIG. 1) and the other end the end surface (light emitting portion) 11a of which is exposed at the distal end surface 10a. The first illuminating optical fiber 11 is an optical fiber as a transmission path that emits the illumination light outputted from the light emitting device 2, from the end surface 11a toward the circumferential surface of the rotor 103.

The second illuminating optical fiber 12 has one end connected to the light emitting device 2 and the other end the end surface (light emitting portion) 12a of which is exposed at the distal end surface 10a. The second illuminating optical fiber 12 is an optical fiber as a transmission path that emits the illumination light outputted from the light emitting device 2, from the end surface 12a toward the circumferential surface of the rotor 103. Note that the first illuminating optical fiber 11 and the second illuminating optical fiber 12 may be connected to different light emitting portions.

The first light-receiving optical fiber 13 has one end connected to the first light receiving device 3 (see FIG. 1) and the other end the end surface (light receiving portion) 13a of which is exposed at the distal end surface 10a. The first light-receiving optical fiber 13 is an optical fiber as a transmission path that receives, at the end surface 13a, the reflected light which is the illumination light reflected on the circumferential surface of the rotor 103 and inputs the received light to the first light receiving device 3.

The second light-receiving optical fiber 14 has one end connected to the second light receiving device 4 (see FIG. 1) and the other end the end surface (light receiving portion) 14a of which is exposed at the distal end surface 10a. The second light-receiving optical fiber 14 is an optical fiber as a transmission path that receives, at the end surface 14a, the reflected light which is the illumination light reflected on the circumferential surface of the rotor 103 and inputs the received light to the second light receiving device 4.

Each of the optical fibers 11 to 14 extends approximately in the axial direction of the optical sensor. Inside the sensor head 10, the first light-receiving optical fiber 13 and the second light-receiving optical fiber 14 extend approximately in the axial direction of the optical sensor and incline in an inverted V shape the mutual distance of which increases toward the distal end surface 10a (in cross-sectional view in parallel with a radial section of the rotor 103). In addition, the first illuminating optical fiber 11 and the second illuminating optical fiber 12 are disposed between the first light-receiving optical fiber 13 and the second light-receiving optical fiber 14 and incline in an inverted V shape the mutual distance of which increases toward the distal end surface 10a (in cross-sectional view in parallel with a radial section of the rotor 103).

The end surfaces 11a to 14a are spaced from one another on the distal end surface 10a (in cross-sectional view in parallel with a radial section of the rotor 103). Note that although in FIG. 2A, the number of each of the optical fibers 11,12,13, and 14 is one, this embodiment is not limited to this number, but each of the optical fibers 11,12,13, and 14 may include two or more optical fibers.

Further, the optical sensor according to this embodiment includes a first metal plate 20 (first plate material) disposed in parallel with and in close contact with the distal end surface 10a, a second metal plate 30 (second plate material) disposed in parallel with the first metal plate 20 and frontward of the first metal plate 20 in the measuring direction (closer to the rotor 103), and an environmental resistance window 40 disposed and fixed between the first metal plate 20 and the second metal plate 30, which regulates the light receiving direction.

The first metal plate 20 has a first inner through-hole 21 formed at a position corresponding to the end surface 11a exposed from the distal end surface 10a, a second inner through-hole 22 similarly formed at a position corresponding the end surface 12a exposed from the distal end surface 10a, a third inner through-hole 23 similarly formed at a position corresponding to the end surface 13a exposed from the distal end surface 10a, and a fourth inner through-hole 24 similarly formed at a position corresponding to the end surface 14a exposed from the distal end surface 10a.

The second metal plate 30 includes a first outer through-hole 31 formed at the intersection with imaginary line W (which is the same as the above imaginary line q) orthogonal to the end surface 11a, a second outer through-hole 32 formed at the intersection with imaginary line X orthogonal to the end surface 12a, a third outer through-hole 33 formed at the intersection with imaginary line Y orthogonal to the end surface 13a, and a fourth outer through-hole 34 formed at the intersection with imaginary line Z (which is the same as the above imaginary line p) orthogonal to the end surface 14a.

The first outer through-hole 31 and the second outer through-hole 32 have larger diameters than the third outer through-hole 33 and the fourth outer through-hole 34. This is because the through-holes 31 and 32 are through-holes for the illumination light and it is preferable that the illumination light should not be narrowed and be emitted toward the rotor 103 with a certain spread.

The environmental resistance window 40 has a property that allows the illumination light and the reflected light to pass through it and is made of a material resistant to high temperature and high steam, for example, diamond or sapphire (this embodiment is not intended to limit the material of the environmental resistance window 40, but the environmental resistance window 40 needs to be at least more resistant to temperature and steam than each optical fiber). Alternatively, an environmental resistance window 40 may be embedded in each of the through-holes 21 to 24 of the first metal plate 20, instead of being disposed between the first metal plate 20 and the second metal plate 30.

Described above is the configuration of the optical sensor according to this embodiment. Note that the procedure for measuring a clearance using the optical sensor according to this embodiment is as described above with reference to FIG. 1.

First, the optical sensor according to this embodiment receives only the reflected light passing through the two through-holes (the through-holes 23 and 33 or the through-holes 24 and 34) of the two metal plates—the first metal plate 20 and the second metal plate 30, which regulate the light receiving optical path (similarly, the illumination optical path is also regulated). Thus, even when white turbidity or wear occurs at the end or its periphery of each optical fiber exposed harsh environment such as high temperature and high steam, the white turbidity or wear does not affect the light receiving direction, and the value of a in the above formula (1) does not vary, allowing the clearance measurement.

In addition, since the environmental resistance window 40 seals the distal end surface 10a; even under high-temperature and high-steam environment, each optical fiber is not affected by the environment. This allows accurate clearance measurement.

In addition, in the optical sensor according to this embodiment, the illuminating optical fibers 11 and 12, and the light-receiving optical fibers 13 and 14 are spaced from each other on the distal end surface 10a. This reduces the interference between the transmitted light and the received light, allowing more accurate clearance measurement.

Further, since the optical sensor according to this embodiment can be made by simply attaching plate materials (the first metal plate 20 and the second metal plate 30) having through-holes and an environmental resistance window 40 between the plate materials, the optical sensor according to this embodiment has advantages in feasibility and processability over metal narrow holes as described in the above Patent Document 1.

In the case where the optical sensor according to the present invention is used for measuring a clearance to a moving object the examples of which include rotors and other moving objects, the same result as above can be obtained by disposing the optical sensor such that the distal end surface of the sensor head faces the moving object to be measured and is in parallel with the moving direction.

INDUSTRIAL APPLICABILITY

The present invention is suitable for optical sensors.

REFERENCE SIGNS LIST 1 sensor unit
2 light emitting device
3 first light receiving device
4 second light receiving device
5 measuring unit
6 optical fibers
10, 50 sensor head
10a, 50a distal end surface (of the sensor head)
11 first illuminating optical fiber
11a end surface (light emitting portion) (of the first illuminating optical fiber)
12 second illuminating optical fiber
12a end surface (light emitting portion) (of the second illuminating optical fiber)
13, 53-1, 53-2, 53-3 first light-receiving optical fiber
13a, 53-1a, 53-2a, 53-3a end surface (light receiving portion) (of the first light-receiving optical fiber)
14, 54-1, 54-2, 54-3 second light-receiving optical fiber
14a, 54-1a, 54-2a, 54-3a end surface (light receiving portion) (of the second light-receiving optical fiber)
20 first metal plate (first plate material)
21 first inner through-hole
22 second inner through-hole
23 third inner through-hole
24 fourth inner through-hole
30 second metal plate (second plate material)
31 first outer through-hole
32 second outer through-hole
33 third outer through-hole
34 fourth outer through-hole
40 environmental resistance window
51, 52 illuminating optical fiber
51a, 52a end surface (light emitting portion) (of the illuminating optical fiber)
101 housing
102 rotating shaft
103 rotor
103a rotor blade
103b outer end surface

The invention claimed is:

1. An optical sensor having a sensor head at a distal end surface of which a light emitting portion and light receiving portions of optical fibers are disposed, the optical sensor comprising:

a first plate material that is in parallel with and in close contact with the distal end surface of the sensor head, the first plate material having through-holes formed at positions corresponding to the light emitting portion and the light receiving portions of the optical fibers;

a second plate material that is disposed in parallel with the first plate material and at a position on a measurement object side of the first plate material, the second plate material having through-holes at intersections of the second plate material and imaginary lines orthogonal to the light emitting portion and the light receiving portions, respectively, of the optical fibers, wherein the first plate material is spaced from the second plate material so as to define a gap between opposing surfaces of the first and second plate materials; and a single environmental resistance window is disposed in the gap between the first plate material and the second plate material, wherein:

the distal end surface of the sensor head is disposed to face a moving object to be measured, the optical fibers include a first light-receiving optical fiber and a second light-receiving optical fiber that receive light from the moving object at the light receiving portions disposed at the distal end surface of the sensor head and input the received light to a first light receiving device and a second light receiving device, respectively, the through-holes of the first plate material include through-holes formed at positions corresponding to the light receiving portions of the first light-receiving optical fiber and the second light-receiving optical fiber, respectively, the through-holes of the second plate material include through-holes respectively formed at intersections of the second plate material and imaginary lines orthogonal to the light receiving portions of the first light-receiving optical fiber and the second light-receiving optical fiber, and the optical sensor further comprises a measuring unit that measures a clearance with the moving object based on timings at which the light from the moving object is inputted to the first light receiving device and the second light receiving device.

2. The optical sensor according to claim 1, wherein:

the optical fibers include an illuminating optical fiber that emits illumination light from a light emitting device, from the light emitting portion at the distal end surface of the sensor head toward the moving object, the through-holes of the first plate material include a through-hole formed at a position corresponding to the light emitting portion of the illuminating optical fiber, the through-holes of the second plate material include a through-hole formed at an intersection of the second plate material and an imaginary line orthogonal to the light emitting portion of the illuminating optical fiber, and the light from the moving object received by the first light-receiving optical fiber and the second light-receiving optical fiber is reflected light of the illumination light emitted from the illuminating optical fiber.

3. The optical sensor according to claim 2, wherein an end surface of the illuminating optical fiber is spaced from the light receiving portions of the first light-receiving optical fiber and the second light-receiving optical fiber on the distal end surface of the sensor head.

4. The optical sensor according to claim 3, wherein in the second plate material, the through-hole formed at the intersection of the second plate material and the imaginary line orthogonal to the light emitting portion of the illuminating optical fiber has a larger diameter than the through-holes formed at the intersections of the second plate material and the imaginary lines of the light receiving portions of the first light-receiving optical fiber and the second light-receiving optical fiber.

5. The optical sensor according to claim 2, wherein in the second plate material, the through-hole formed at the intersection of the second plate material and the imaginary line orthogonal to the light emitting portion of the illuminating optical fiber has a larger diameter than the through-holes formed at the intersections of the second plate material and the imaginary lines of the light receiving portions of the first light-receiving optical fiber and the second light-receiving optical fiber.

6. The optical sensor according to claim 2, wherein the environmental resistance window has a property that allows light to pass through the environmental resistance window and a higher resistance to temperature and steam than the optical fibers.

7. The optical sensor according to claim 6, wherein an end surface of the illuminating optical fiber is spaced from the light receiving portions of the first light-receiving optical fiber and the second light-receiving optical fiber on the distal end surface of the sensor head.

8. The optical sensor according to claim 7, wherein in the second plate material, the through-hole formed at the intersection of the second plate material and the imaginary line orthogonal to the light emitting portion of the illuminating optical fiber has a larger diameter than the through-holes formed at the intersections of the second plate material and the imaginary lines of the light receiving portions of the first light-receiving optical fiber and the second light-receiving optical fiber.

9. The optical sensor according to claim 6, wherein in the second plate material, the through-hole formed at the intersection of the second plate material and the imaginary line orthogonal to the light emitting portion of the illuminating optical fiber has a larger diameter than the through-holes formed at the intersections of the second plate material and the imaginary lines of the light receiving portions of the first light-receiving optical fiber and the second light-receiving optical fiber.

10. The optical sensor according to claim 1, wherein the environmental resistance window has a property that allows light to pass through the environmental resistance window and a higher resistance to temperature and steam than the optical fibers.

11. The optical sensor according to claim 10, wherein an end surface of the illuminating optical fiber is spaced from the light receiving portions of the first light-receiving optical fiber and the second light-receiving optical fiber on the distal end surface of the sensor head.

12. The optical sensor according to claim 11, wherein in the second plate material, the through-hole formed at the intersection of the second plate material and the imaginary line orthogonal to the light emitting portion of the illuminating optical fiber has a larger diameter than the through-holes formed at the intersections of the second plate material and the imaginary lines of the light receiving portions of the first light-receiving optical fiber and the second light-receiving optical fiber.

13. The optical sensor according to claim 10, wherein in the second plate material, the through-hole formed at the intersection of the second plate material and the imaginary line orthogonal to the light emitting portion of the illuminating optical fiber has a larger diameter than the through-holes formed at the intersections of the second plate material and the imaginary lines of the light receiving portions of the first light-receiving optical fiber and the second light-receiving optical fiber.

14. The optical sensor according to claim 1, wherein the first light-receiving optical fiber and the second light-receiving optical fiber are inclined with respect to the first plate material.

15. The optical sensor according to claim 1, wherein the environmental resistance window seals the distal end surface of the sensor head.

* * * * *